No. 768,631. PATENTED AUG. 30, 1904.
A. G. SMITH.
INCUBATOR.
APPLICATION FILED JULY 5, 1901. RENEWED MAY 16, 1904.
NO MODEL.

Witnesses:
Fred S. Greenleaf.
W. C. Lunsford.

Inventor.
Adolphus G. Smith,
by Crosby & Gregory
Attys

No. 768,631. Patented August 30, 1904.

UNITED STATES PATENT OFFICE.

ADOLPHUS G. SMITH, OF BOSTON, MASSACHUSETTS, ASSIGNOR OF TWO-THIRDS TO CHARLES W. H. SANBORN, OF BOSTON, MASSACHUSETTS, AND ALBERT P. KENT, OF CHELSEA, MASSACHUSETTS.

INCUBATOR.

SPECIFICATION forming part of Letters Patent No. 768,631, dated August 30, 1904.

Application filed July 5, 1901. Renewed May 16, 1904. Serial No. 208,090. (No model.)

*To all whom it may concern:*

Be it known that I, ADOLPHUS G. SMITH, a citizen of the United States, residing at Boston, county of Suffolk, State of Massachusetts, have invented an Improvement in Incubator-Heating Devices, of which the following description, in connection with the accompanying drawings, is a specification, like characters on the drawings representing like parts.

This invention has for its object the production of a novel incubator-heating device wherein the heat furnished by electricity is and may be kept substantially uniform.

Figure 1:
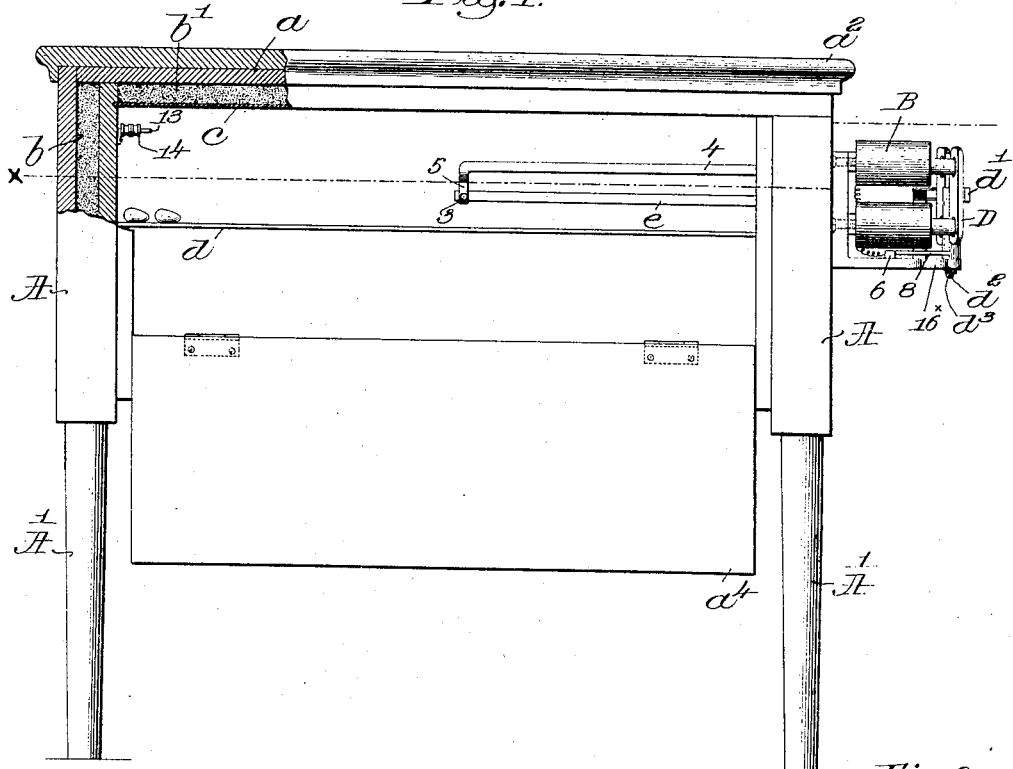
Figures 2, 3:
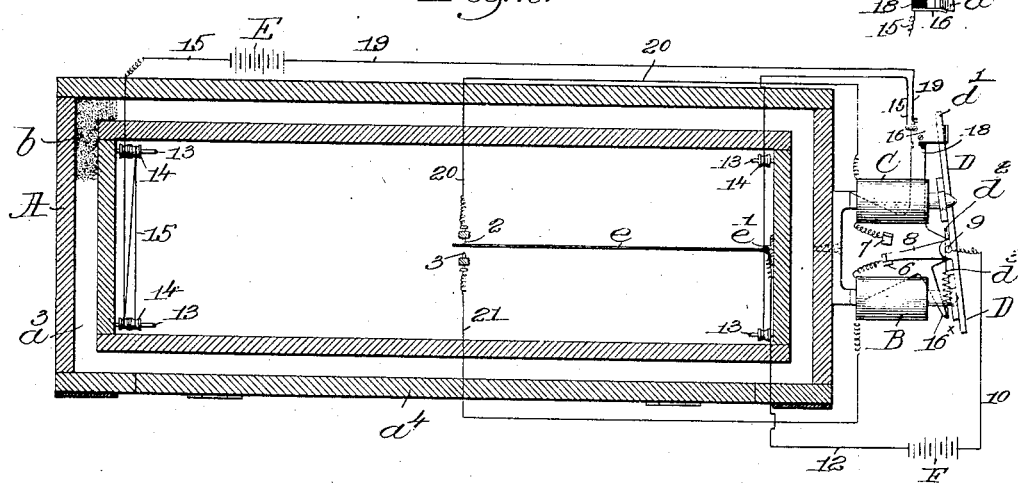

Figure 1 in side elevation, partly broken out, represents an incubator embodying my invention; Fig. 2, a section in the dotted line $x$, Fig. 1; and Fig. 3 is a detail of the switch operative in connection with the electric heater.

The framework of the incubator consists, essentially, of a suitable box-like frame A, which may stand on legs A', the frame being composed, preferably, of double sides and ends, the space between the material constituting the double sides and ends being filled in with a non-conductor of heat, as at $b$, which may be asbestos, infusorial earth, or any usual non-conducting material. The sides and ends of the box receive between them a sheet-iron top plate $c$, on which is laid suitable non-heat-conducting material, as at $b'$, and thereafter a board $a$ is applied to cover the material $b'$, and the box is then completed by a suitable cover $a^2$. The box has a suitable bottom $a^3$, and one side of the box has a door $a^4$, by which to gain access to the egg-chamber and to the egg-sustainer $d$, which may be a shelf of any usual kind. The egg-chamber is provided with a suitable thermostat $e$, shown as a tongue, composed of two or more different metals and united to a metallic block $e$, secured to one wall of the box. The box also sustains in said chamber suitable points 2 3, sustained, as herein shown, each preferably by a suitable arm, as 4, each arm having a depending end 5. Normally the free end of the tongue contacts with the point 2. The point 2 and the fixed end of the tongue are in a normally closed electric circuit containing a battery F and suitable pairs of electromagnets B C, the magnets having contact-plates 6 7, with which coacts an arm 8 of an armature D, represented as mounted upon a vertical pivot 9, the pivot of the armature being connected by a wire 10 with the battery F, while the wire 12 at the opposite pole of said battery leads to the plate $e'$. The egg-chamber contains, as herein represented, suitable rods, as 13, upon which are strung suitable non-conductors, represented as porcelain spools 14, there being a line of said spools from one to the other end of the chamber. These spools receive about them in succession a wire 15, extended from a battery E, the wire after leaving the last spool being connected with the metal plate 16, a second plate 17, insulated by suitable insulating material 18 (see Fig. 3) from the plate 16, having connected with it a suitable wire, as 19, which leads to the opposite pole of the battery E. The circuit on the battery E is completed by inserting the projecting end $d'$ of the armature D between said plates, as represented in the drawings, thus causing the battery to heat the wire 15 entering into the heater and supply the proper amount of heat to the incubator.

The point 2 is connected by wire 20 with the wire of one of the magnets, as C, and the point 3 is connected by wire 21 with a wire leading to the magnet B.

Having laid the eggs upon the support $d$, the door $a^4$ will be closed, and the armature D will be turned into the position shown in Figs. 2 and 3, closing the circuit of the battery E on the electric heater described. In this condition the arm 8 of the armature will rest on the contact-plate 6 and the tongue $e$ on the point 2. Before the heat rises to a degree that might be injurious to the eggs the thermostat-tongue $e$ will be actuated by the heat and made to contact with the point 3, and immediately the circuit on the magnet B through the battery F will be closed, swinging the end $d'$ of the armature D from between the plates 16 17, thus cutting off the heater, and at the same time the arm 8 will meet the contact 7. As the temperature decreases the tongue $e$ will gradually assume its normal position and contact with the point 2, which will complete the circuit on the magnet C, causing it to actuate the armature D and again force the arm $d'$ thereof between the plates 16 17.

The wires 10, 12, 20, 21, 15, and 19 are shown in diagram, and they may be connected in any suitable way with the incubator-framework.

The armature has a projecting arm $d^2$, with which is connected a spring $d^3$, which aids in turning the armature about the pivot 9 after the armature has been started by closing the circuit thereon.

The electric current may be supplied to the heater from any suitable source of electric energy, the battery F being merely shown as one such source.

Having described my invention, what I claim, and desire to secure by Letters Patent, is—

1. An incubator-heating device comprising an electric heater located within the chamber to be heated, pairs of electromagnets, an armature supported between the pairs of electromagnets and adapted to be moved into different positions by the energization of the pairs of electromagnets said armature having a projecting end to close and break the heating-circuit and having a projecting arm, a thermostat in electric circuit with the pairs of electromagnets and consisting of a flexible tongue having one end supported within the chamber and the other end free, contact-points also within the chamber between which the free end of the flexible tongue projects, arms located in the chamber for supporting the contact-points in fixed position, and contact-plates connected to the circuits of the electromagnets and adapted to be engaged by the projecting arm of the armature.

2. An incubator-heating device comprising an electric heater located within the chamber to be heated, pairs of electromagnets, an armature pivotally mounted between the pairs of electromagnets, and having an extended portion adapted to make and break the electric circuit of the heater, an arm carried by and projecting from the armature, contact-plates separately connected to the said electromagnets, and adapted to be engaged by the arm as the armature moves to make and break the circuit of the heater, a flexible tongue located within the chamber and supported at one end, contact-points disposed near the free end of the tongue and electric circuits connecting the contact-points with the before-mentioned electromagnets and contact-plates.

3. An incubator-heating device comprising an electric heater, located within the chamber to be heated, pairs of electromagnets, an armature pivotally mounted between the pairs of electromagnets and adapted to be moved on its pivot by the energization of one or the other of said electromagnets so as to close the circuit on the electric heater when in one position and to break the circuit when in the other position, an arm carried by and projecting from the armature, contact-plates separately in circuit with the electromagnets and disposed to be engaged by the arm, as the armature is moved from one to the other position as described, a flexible tongue supported at one end within the chamber and in electric circuit with the armature, and fixed contact-points also within the chamber, between which the free end of the flexible tongue extends, the contact-points being separately in circuit with one of the pairs of electromagnets and its connected contact-plate.

4. An incubator-heating device comprising an electric heater located within the chamber to be heated, a wire disposed within the chamber, pairs of electromagnets, an armature coacting with the pairs of electromagnets, and adapted in one position to close the circuit through the wire, and in the other position to break the circuit therethrough, a thermostat in an electric circuit with the pairs of electromagnets, and having a tongue supported within the chamber, and contact-points within the chamber between which the free end of the tongue extends, and in electric circuit with the pairs of electromagnets, the flexible tongue being adapted to change contact with the contact-points within the incubator-chamber under varying temperatures to cut in and out the electric heater.

In testimony whereof I have signed my name to this specification in the presence of two subscribing witnesses.

ADOLPHUS G. SMITH.

Witnesses:
GEO. W. GREGORY,
C. W. H. SANBORN.